(12) United States Patent
Sato et al.

(10) Patent No.: US 7,286,728 B2
(45) Date of Patent: Oct. 23, 2007

(54) OPTICAL ELEMENT AND OPTICAL SWITCH

(75) Inventors: Keisuke Sato, Kawasaki (JP); Masao Kondo, Kawasaki (JP); Masatoshi Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 11/119,532

(22) Filed: May 2, 2005

(65) Prior Publication Data

US 2006/0153486 A1    Jul. 13, 2006

(30) Foreign Application Priority Data

Jan. 11, 2005    (JP) .............................. 2005-004252

(51) Int. Cl.
*G02B 6/10*    (2006.01)
*G02B 6/26*    (2006.01)

(52) U.S. Cl. ............................ 385/8; 385/40; 385/130; 385/141

(58) Field of Classification Search .................... None
See application file for complete search history.

(56) References Cited

U.S. PATENT DOCUMENTS

| | | | |
|---|---|---|---|
| 5,179,533 A * | 1/1993 | Bullington et al. | 365/110 |
| 6,873,751 B2 * | 3/2005 | Nishizawa et al. | 385/8 |
| 6,879,739 B2 * | 4/2005 | Nishizawa et al. | 385/8 |

FOREIGN PATENT DOCUMENTS

JP    2003-177262    6/2003

* cited by examiner

*Primary Examiner*—Rodney Bovernick
*Assistant Examiner*—Omar Rojas
(74) *Attorney, Agent, or Firm*—Kratz, Quintos & Hanson, LLP (57) ABSTRACT

In an optical element aimed at readily and accurately controlling a refractive index of an electrooptic effect film, and at making the device adaptive to further downsizing, a voltage control unit controls the refractive index of light in an optical waveguide between two values of a first voltage and a second voltage bounded at a predetermined voltage which corresponds to an anti-ferroelectric phase transition point, based on a fact that the refractive index of a core layer of the optical waveguide largely varies in a digital manner at the predetermined voltage, but is kept almost constant thereunder and thereabove.

13 Claims, 10 Drawing Sheets

OPTICAL ELEMENT AND OPTICAL SWITCH

CROSS-REFERENCE TO RELATED APPLICATIONS

This application is based upon and claims the benefit of priority from the prior Japanese Patent Application No. 2005-004252, filed on Jan. 11, 2005, the entire contents of which are incorporated herein by reference.

BACKGROUND OF THE INVENTION

1. Field of the Invention

The present invention relates to an optical element and an optical switch used in technical fields such as optical communication and optical signal processing.

2. Description of the Related Art

Transmission bandwidth for optical communication has been constantly expanding in recent years, and this promotes increases in speed and capacity, as well as being coupled with advancement in wavelength division multiplexing technology. Optical switches are necessary to architect hardware infrastructure of optical fiber network in backbone network. Of optical switches, those available with single-mode optical fibers are necessary. This demands that light be made switchable irrespective of the polarized state of light such as TE mode and TM mode. As solutions for the demand, there have been proposed a mechanical drive system such as so-called MEMS (micro-electromechanical system) based on a switching of light by moving a micro-mirror, and a thermooptical drive system based on heat-induced variation in refractive index and resultant changes in the direction of propagation of light.

The mechanical drive system or thermooptical drive system, however, suffers from a problem in that switching destinations of optical signals takes a relatively long time, on the order of a millisecond (msec), and that the limit speed of switching is therefore slow. Faster optical switches are therefore desired in recent trends in further advancing network speed.

One known method of rapidly varying the refractive index is the use of the electrooptic effect (electrooptic effect system). Use of such an electrooptic effect system makes it possible to rapidly vary the refractive index within an extremely short time on the order of nanoseconds (nsec) to microseconds (μsec), and consequently makes it possible to realize an optical switch capable of an extremely rapid operation.

[Patent Document 1] Japanese Patent Application Laid-Open No. 2003-177262

The refractive index in the optical switch based on electrooptic effect can be changed by applying a variable voltage to an electrooptic effect film in which light propagates, under proper adjustment of the voltage value.

However, a relation between the applied voltage and the amount of change in the refractive index cannot unconditionally be determined, as a result of materials used for an optical element composing the optical switch, dimensional error in element portions, and parasitic capacitance caused by mounting. This inevitably demands severe adjustment from device to device, degrades yield ratio of products, and is a major reason for rejecting requests for further downsizing of the device.

The present invention was conceived after considering the above-described problems, and an object thereof is to provide an optical element capable of readily and accurately controlling the refractive index of an electrooptic effect film, and is adaptive to further downsizing, and also to provide an optical switch applied with the optical element.

SUMMARY OF THE INVENTION

According to one aspect of the present invention, there is provided an optical element which includes a substrate; an electrooptical film formed over the substrate, being composed of at least one layer of anti-ferroelectric material having an electrooptic effect; and a voltage control unit applying variable voltage to the electrooptic effect film so as to control refractive index thereof for light passing through the electrooptic effect film, wherein the voltage control unit controls the refractive index based on two values of a first voltage less than a reference value, the reference value being a voltage below which the anti-ferroelectric phase transition point of the electrooptic effect film is attained, and a second voltage greater than the reference value.

According to another aspect of the present invention, there is provided an optical element which includes a substrate; an electrooptical film formed over the substrate, being composed of at least one layer of anti-ferroelectric material having an electrooptic effect; and a voltage control unit applying a variable voltage to the electrooptic effect film so as to control the refractive index thereof for light passing through the electrooptic effect film, and has a first voltage region showing nearly a constant refractive index with respect to applied voltage, and a second voltage region showing a sharp change in the refractive index with respect to the applied voltage.

According to still another aspect of the present invention, there is provided an optical switch which includes an optical waveguide configured as having at least one layer of electrooptic effect film; a plurality of input channels disposed in parallel at one end of the waveguide, through which optical signals are input; a plurality of output channels formed as being disposed in parallel at the other end of the waveguide, through which optical signals are output; and a voltage control unit applying variable voltage to the electrooptic effect film so as to control the refractive index thereof for light input through the input channels, wherein the voltage control unit controls the refractive index based on two values of a first voltage less than a reference value, the reference value being a voltage below which the anti-ferroelectric phase transition point of the electrooptic effect film is attained, and a second voltage greater than the reference value.

The present invention successfully realizes an optical element capable of readily and accurately controlling the refractive index of an electrooptic effect film, and is adaptive to further downsizing, and an optical switch applied with the optical element.

DETAILED DESCRIPTION OF EXEMPLARY EMBODIMENTS

Figure 1A:
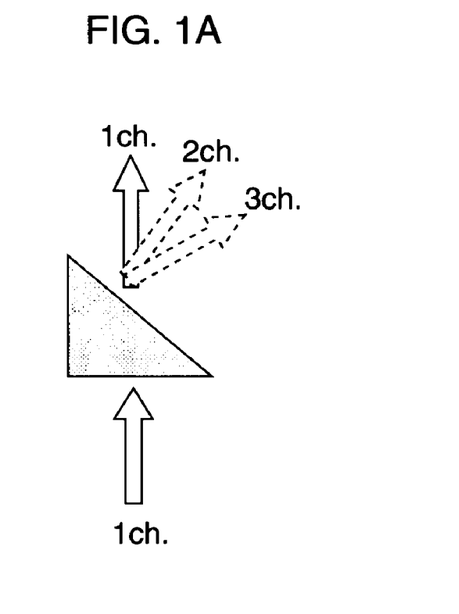
FIGS. 1A and 1B are characteristic drawings showing a control method according to a comparative example of the present invention.
Figure 1B:
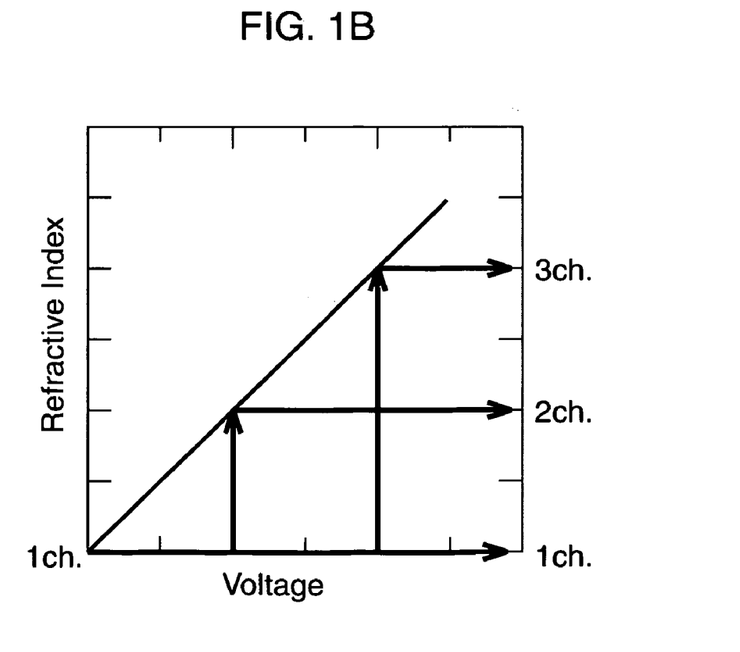

Prior to an explanation of a basic concept of the present invention, first, a comparative example of the present invention will be explained. The comparative example relates to a method of controlling the refractive index using an electrooptic effect film having, so to speak, an analog-like property. In this method, as shown in FIG. 1A, voltage applied to a pair of electrodes disposed on and below an optical waveguide having an electrooptic effect film (only the upper electrode is shown for simplicity of the illustration) is adjusted. The refractive index in this case continuously varies corresponding to a continuously-varying applied voltage as shown in FIG. 1B, and the light is output to a desired channel corresponding to any of the individual refractive indices. Because the refractive index varies in an analog-like manner with respect to the applied voltage as described in the above, and only a minute change in the applied voltage affects the refractive index, it is impossible to unconditionally determine a relation between the applied voltage to the electrooptic effect film and the amount of change in the refractive index, due to materials composing the optical element, dimensional error in the element portions and parasitic capacitance caused by mounting.

One possible solution may be feed-back control of the applied voltage.

Figure 2:
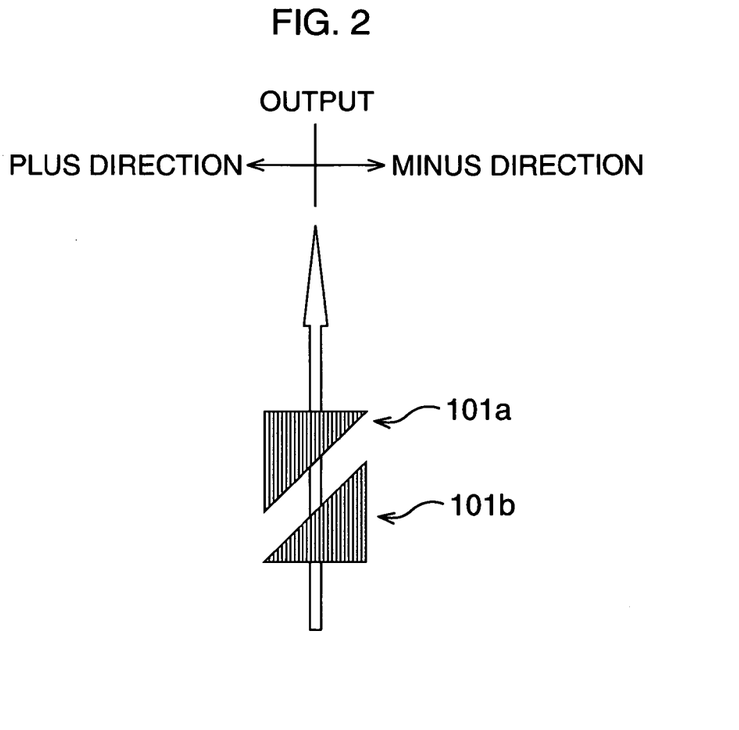
FIG. 2 is a schematic drawing showing a state of feedback control of applied voltage.

As shown in FIG. 2, the upper electrode is configured by a pair of prism electrodes, wherein the light is deflected to the negative direction by raising voltage applied to a prism electrode 101a, and to the positive direction by raising voltage applied to a prism electrode 101b. Position of output is thus adjustable by finely regulating the voltage to be applied to the prism electrodes 101a, 101b. The tracking control described above, however, needs independent control of two prism electrodes, and this undesirably complicates the control, and demands an additional fine regulatory mechanism.

Aiming at solving the above-described problems, the present inventors went through extensive investigation to finally propose a technique capable of precisely controlling the refractive index of an electrooptic effect film only by an extremely simple configuration, using an anti-ferroelectric as a material for composing the electrooptic effect film, and making use of so-to-speak, the digital-like property of this electrooptic effect film, and conceived an optical element and optical switch applied with the optical element, successfully eliminating labor-consuming operations and complicated attachments, such as device-wise fine adjustment and a fine regulatory mechanism.

Figure 3:
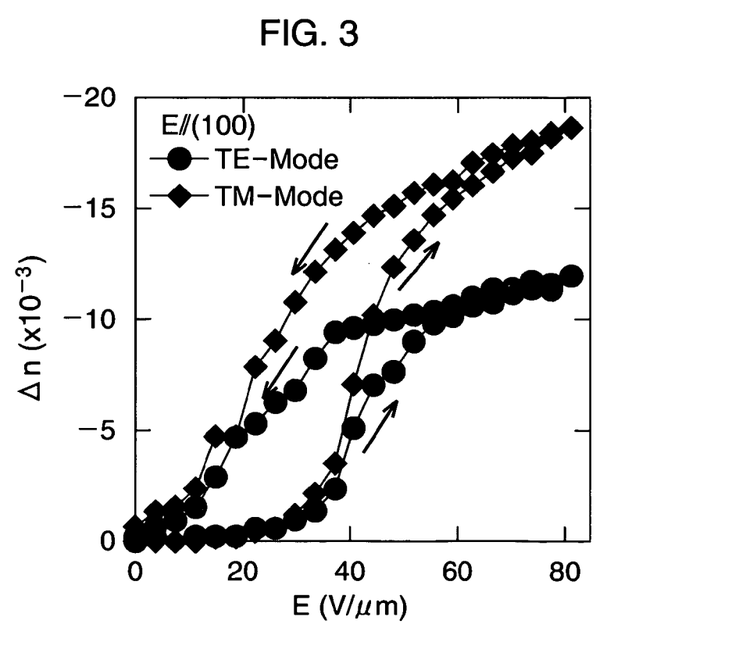
FIG. 3 is a characteristic chart showing changes in refractive index of light under application of electric field (voltage) to an anti-ferroelectric electrooptic effect film.

Investigation was made regarding changes in the refractive index of light in an electrooptic effect film made of $PbZrTiO_3$, which is a representative anti-ferroelectric, formed on a 1% Nb-doped $SrTiO_3$ substrate. Results are shown in FIG. 3. There are shown changes in the refractive index both for the TE mode having no electric field component in the direction of propagation of light, and for the TM mode having no magnetic field component in the direction of propagation of light. The abscissa plots applied electric field (V/µm), and the ordinate plots changes in refractive index in the negative direction ($\Delta n$ ($\times 10^{-3}$)), respectively.

The refractive index does not vary greatly even when the applied electric field increases up to 30 V/µm or around, and remains almost constant. The refractive index, however, sharply decreases when an electric field as large as 30 V/µm or greater is applied, and reaches almost a plateau at approximately 40 V/µm or above. This change is attributable to a phase transition from a paraelectric state to a ferroelectric state, which is specific to anti-ferroelectrics, and it is supposed that an anti-ferroelectric phase transition point falls within a region ranging from approximately 30 V/µm to 40 V/µm (practically the anti-ferroelectric phase transition point is supposed to exist as an anti-ferroelectric phase transition region having a certain degree of broadness). When the applied electric field is reduced to 0 V/µm, the refractive index almost returns to the level prior to the voltage application.

Figure 4:
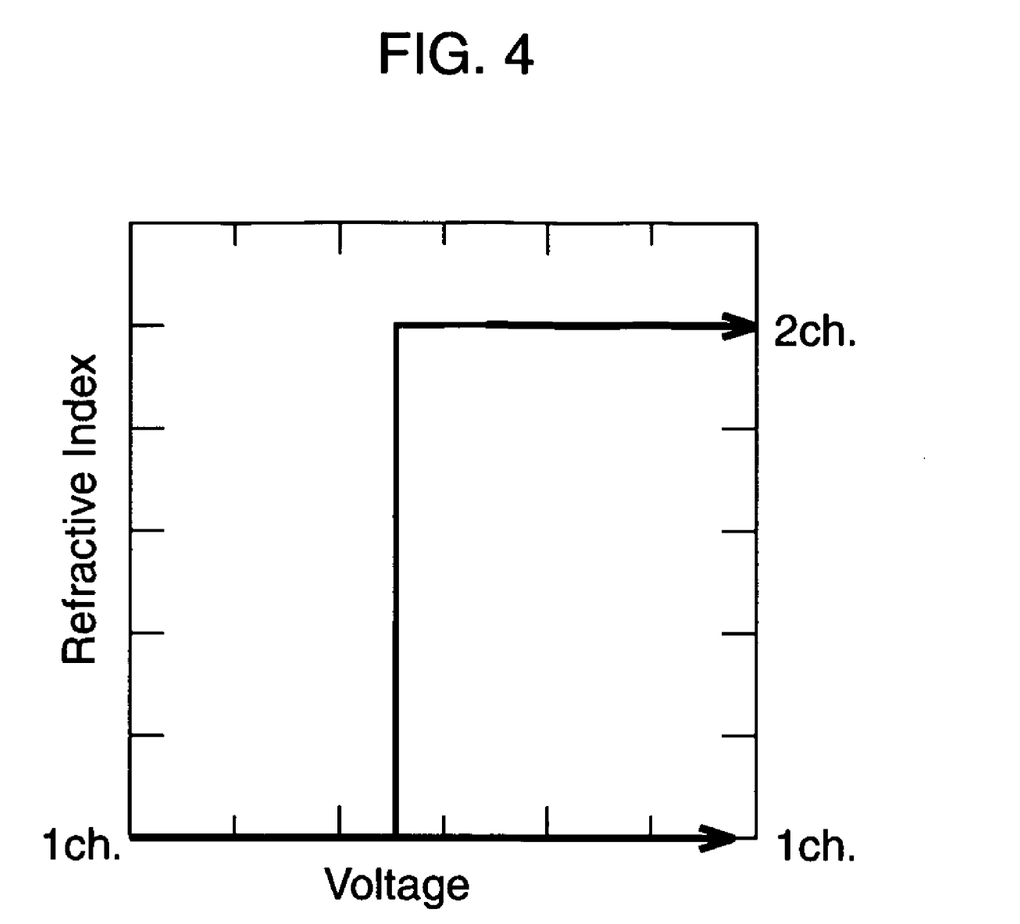
FIG. 4 is a conceptual drawing of a control method according to the present invention.

Based on the understanding of the above-described behavior of the anti-ferroelectric from a digital point of view, the present invention makes use of two regions in which the refractive index remains almost constant, which are bounded by a boundary value of approximately 30 V/µm in the above example. FIG. 4 is a conceptual drawing showing a control method of the present invention. The abscissa represents the applied voltage, and the ordinate represents the output channel corresponding to the light deflection. For convenience's sake, FIG. 4 expresses a region ranging from approximately 30 V/µm to 40 V/µm as being idealized by a single point corresponding to the anti-ferroelectric phase transition point. As is obvious from the drawing, the refractive index sharply varies in the vicinity of a predetermined voltage corresponded to the anti-ferroelectric phase transition point, with respect to continuous changes in the applied voltage. Referring now to FIG. 3 as combined with FIG. 4, the refractive index remains almost unchanged at an applied voltage of 30 V/µm or below (first voltage region), yielding an almost rectilinear light. The refractive index sharply changes in the region ranging from approximately 30 V/µm to 40 V/µm (second voltage region). The refractive index is kept almost unchanged again at an applied voltage of approximately 40 V/µm or above, yielding an almost constantly deflected light. In other words, the refractive index largely varies in a digital manner, as being bounded by a so-to-speak boundary region ranging from approximately 30 V/µm to 40 V/µm which includes the anti-ferroelectric phase transition point. The present invention defines the voltage corresponding to the applied electric field of approximately 30 V/µm or below, where the refractive index remains almost constant (more specifically 0 V), as a first voltage, and the voltage corresponding to the applied electric field of approximately 40 V/µm or above, where the refractive index remains almost constant, as a second voltage, and uses these two values in order to appropriately select output channels (two output channels in this example) through which the light is output.

In the above-described example, the refractive index remains at different almost-constant values, respectively, in two regions bounded by the boundary region ranging approximately from 30 V/μm to 40 V/μm, one of which is a region (region A) not greater than approximately 30 V/μm, and the other is a region (region B) not less than approximately 40 V/μm, so that changes in the applied voltage do not affect the refractive index in two these regions A, B. This allows arbitrary selection of a first voltage (more specifically, 0 V) in the region A, and a second voltage in the region B, wherein any slight shifts from the first voltage and the second voltage do not affect the refractive index. This makes it possible to unconditionally determine the relation between the applied voltage to the electrooptic effect film and amount of change in the refractive index, irrespective of materials composing the optical elements, dimensional error in the element portions, and parasitic capacitance caused by mounting. Because changes in the refractive index can be controlled in a digital manner, the present invention is successful in eliminating any device-wise fine adjustment and tracking control mechanism of the applied voltage, and in realizing an optical element capable of exactly obtaining desired changes in the refractive index only by an extremely simple configuration. By applying this technique to optical switching, it is possible to arbitrarily and exactly select the output channels (two channels in the above example) through which the light is output, and to adapt it to further downsizing of the device.

It is to be noted herein that Patent Document 1 discloses use of a ferroelectric or anti-ferroelectric as a material composing the core layer of the optical waveguide, but makes no description regarding the operational principle of the core layer composed of an anti-ferroelectric, and is by no means suggestive of the present invention.

Specific Embodiments of the Present Invention

The following paragraphs will detail specific embodiments of the present invention, referring to the attached drawings.

The first embodiment discloses an exemplary case where the present invention is applied to an optical deflector as the optical element. The optical deflector refers to an optical element capable of outputting the incident light after deflecting it at a predetermined angle.

Figure 5A:
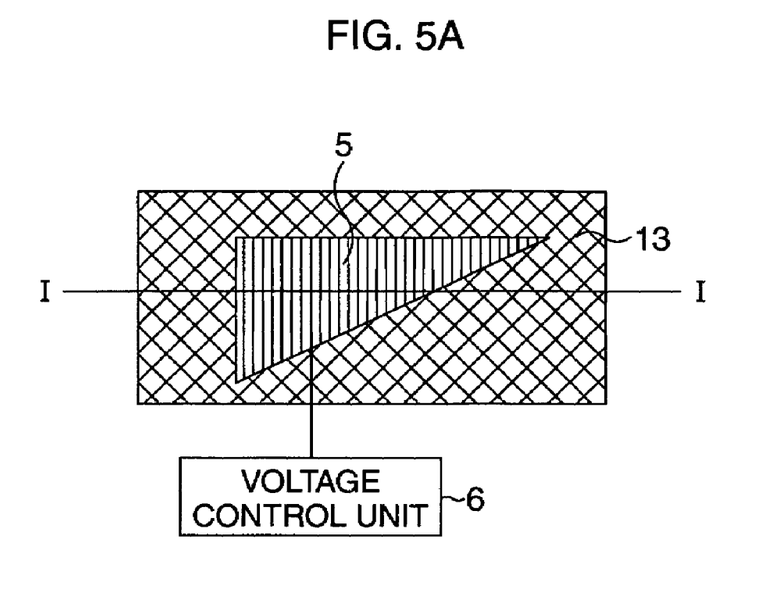
FIGS. 5A and 5B are schematic drawings showing a principal configuration of an optical deflector according to a first embodiment.
Figure 5B:
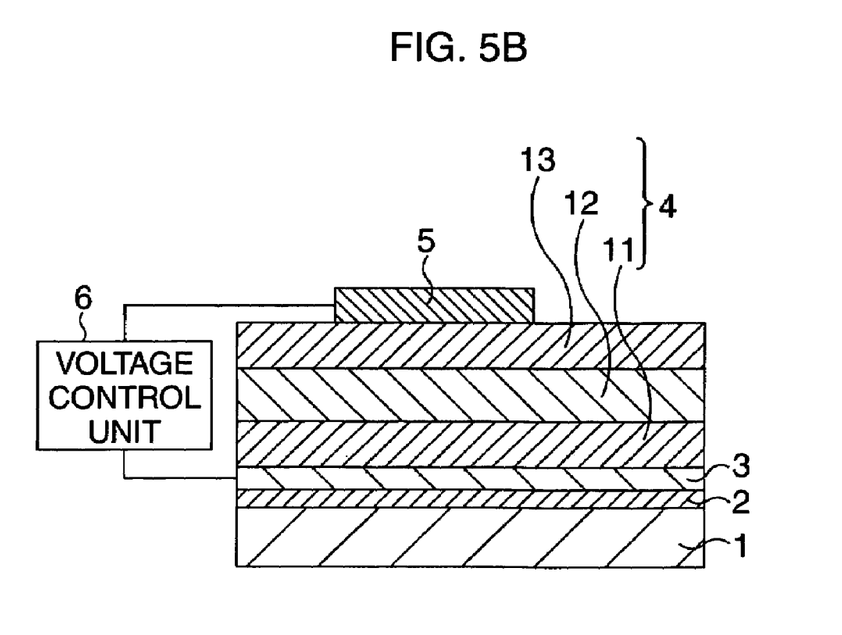

FIGS. 5A and 5B are schematic drawings showing a principal configuration of the optical deflector according to the first embodiment, wherein FIG. 5A is a plan view, and FIG. 5B is a sectional view taken along line I-I in FIG. 5A.

The optical deflector includes a stress relaxation layer 2 formed on a substrate 1, a lower electrode 3 formed on the stress relaxation layer 2, an optical waveguide 4 composed of an electrooptical material, stacked on the lower electrode 3, an upper electrode 5 disposed on the optical waveguide 4 so as to oppose with the lower electrode 3 while placing the optical waveguide 4 in between, and a voltage control unit 6 applying a variable voltage between the lower electrode 3 and upper electrode 5.

The substrate 1 herein is composed of an insulating material, which is mainly composed of $SrTiO_3$ (STO), for example, and is typically configured by using STO containing 1% of Nb as a material, so as to attain a (100) orientation of the main growth surface.

The stress relaxation layer 2 is composed of a material such as $PbMg_{0.5}W_{0.5}O_3$, and functions so as to moderate stress, ascribable to the substrate 1, exerted on the optical waveguide 4.

The lower electrode 3 is configured to have at least one film having at least any one selected from $SrRuO_3$, $CaRuO_3$, $LaNiO_3$, $(La_xSr_{1-x})CoO_3$ ($0 \leq x \leq 1$) and $(La_xSr_{1-x})MnO_3$ ($0 \leq x \leq 1$) as a major component, and is connected to one end of the voltage control unit 6.

The optical waveguide 4 is a so-called, slab-type waveguide, includes two or more layers of the electrooptic effect film, three layers stacked herein, and is specifically configured as having a lower cladding layer 11 and an upper cladding layer 13, while holding a core layer 12 in between. In this embodiment, the core layer 12 is specifically formed using an anti-ferroelectric as a material. More specifically, the core layer 12 is composed of a material containing, as a simple perovskite structure, at least any one selected from $NaNbO_3$, $PbZrO_3$, $Pb(Mg_{1/2}W_{1/2})_xO_3$, $Pb(Cd_{1/2}W_{1/2})_xO_3$, $Pb(Mn_{1/2}Re_{1/2})_xO_3$, $Pb(Yb_{1/2}Nb_{1/2})_xO_3$, $Pb(Lu_{1/2}Nb_{1/2})_xO_3$, $Pb(La_{1/2}Ta_{1/2})_xO_3$, $Pb(Mn_{2/3}W_{1/3})_xO_3$, $(1-x)NaTaO_3 \cdot xKNbO_3$ ($0.4 \leq x \leq 1$), $(1-x)NaNbO_3 \cdot xKTaO_3$ ($0 \leq x \leq 1$), $(1-x)PbZrO_3 \cdot xNaNbO_3$ ($0 \leq x \leq 0.1$, $0.8 \leq x \leq 1$), $(1-x)NaNbO_3 \cdot x(1/2PbNb_2O_6)$ ($0 \leq x \leq 0.1$), $(1-x)PbZrO_3 \cdot xPbTiO_3$ ($0 \leq x \leq 0.1$), $(1-x)PbHfO_3 \cdot xCaHfO_3$ ($0 \leq x \leq 0.2$), $(1-x)(Na_{1/2}Bi_{1/2})TiO_3 \cdot xPbZrO_3$ ($0.9 \leq x \leq 1$), $(1-x)PbZrO_3 \cdot x(K_{1/2}Bi_{1/2})ZrO_3$ ($0.4 \leq x \leq 1$), $(1-x)NaTaO_3 \cdot xKNbO_3$ ($0.4 \leq x \leq 1$, $0 \leq x 0.5$), $xPb(Fe_{2/3}U_{1/3})O_3 \cdot (1-x)PbZrO_3$ ($0 \leq x \leq 0.1$), $(Pb_{1-x}Sr_x)(Ti_{1-y}Zr_y)O_3$ ($0 \leq x \leq 0.4$, $0.7 \leq y \leq 1$), $(1-x)Pb(Ti_{1-y}Zr_y)O_3 \cdot xLaFeO_3$ ($0 \leq x \leq 0.2$, $0.7 \leq y \leq 1$), $(Pb_{0.97}La_{0.02})(Ti_{1/2}(Zr_{1-x}Sn_x)_{1/2})O_3$ ($0 \leq x \leq 0.5$), $0.9(Pb_{0.99}(Ti_{0.98}Nb_{0.02})O_3 \cdot 0.1(xPb_{0.99}(Sn_{0.98}Nb_{0.02})O_3 \cdot (1-x)Pb_{0.99}(Zr_{0.98}Nb_{0.02})O_3$ ($0.5 \leq x \leq 1$), $Pb_{0.987}(Ti_xZr_{0.975-x}Nb_{0.025})O_3$ ($0.5 \leq x \leq 1$) and $(Pb_{1-x}La_{(3/2)x})(Zr_{1-y}Ti_y)$ ($0 \leq x \leq 0.3$, $0.8 \leq y \leq 1$).

The anti-ferroelectric material composing the core layer 12 may have a tungsten bronze structure. More specifically, it is also preferable to form the core layer 12 using any one material selected from $(Pb_{1-x}Ba_x)Nb_2O_6$ ($0 \leq x \leq 0.4$), $(1-x)(PbNb_2O_6) \cdot 2xPbTiO_3$ ($0 \leq x \leq 0.1$) and $Ba_{1-x}Ca_xNb_2O_6$ ($0 \leq x \leq 0.6$).

The lower and upper cladding layers 11, 13 are typically formed using $(PbLa)ZrO_3$ as a material. $(PbLa)ZrO_3$ used herein can exhibit an anti-ferroelectric property depending on its composition.

The upper electrode 5 is formed as a triangle pattern on the optical waveguide 4, and is connected to the other end of the voltage control unit 6.

The voltage control unit 6 applies a variable voltage between the lower electrode 3 and upper electrode 5, so as to vary and control the refractive index of light in the optical waveguide 4. The voltage control unit 6 herein controls the refractive index of light in an optical waveguide 4 between two values of a first voltage and a second voltage bounded by a predetermined voltage which corresponds to an anti-ferroelectric phase transition point, based on a fact that the refractive index of the core layer 12 of the optical waveguide 4 largely varies in a digital manner at the predetermined voltage, but is kept almost constant thereunder and thereabove. The anti-ferroelectric phase transition point in a practical case falls in a boundary region having a certain width (a region ranging from approximately 30 V/μm to 40 V/μm for the case of the above-described $PbZrTiO_3$), so that the first voltage is set to a value not greater than a minimum value of the boundary region, and the second voltage is set to a value not less than a maximum value of the boundary region.

A method of fabricating the optical deflector according to this embodiment will now be explained.

Figure 6A:
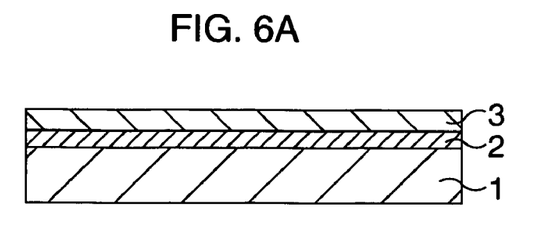
FIGS. 6A to 6C are schematic sectional views showing a method of fabricating the optical deflector according to the first embodiment.
Figure 6B:
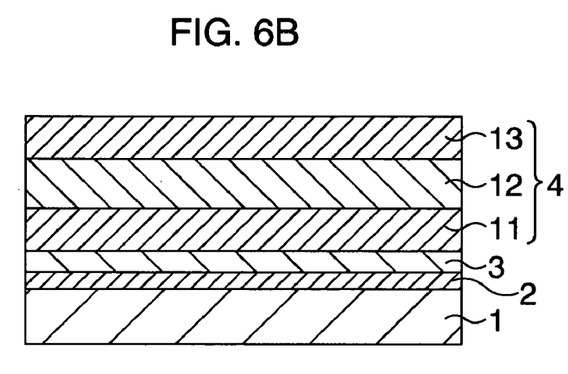
Figure 6C:
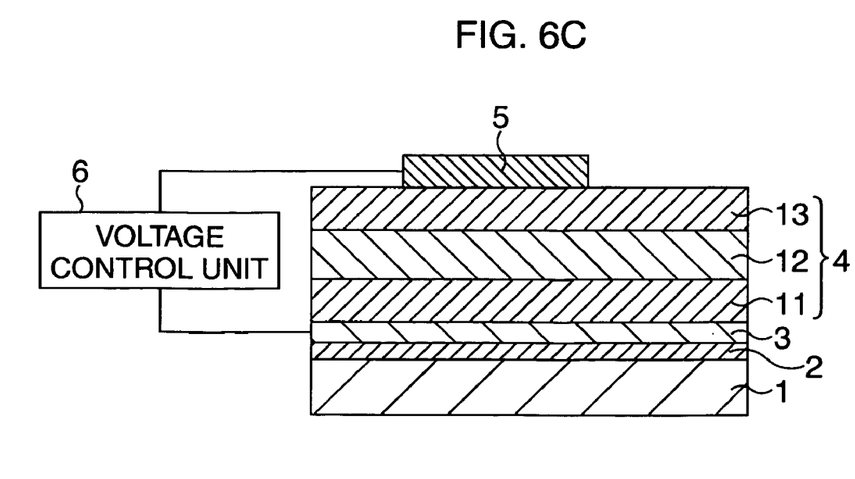

FIGS. 6A to 6C are schematic sectional views sequentially showing process steps of a method of fabricating the optical deflector according to the first embodiment.

First, as shown in FIG. 6A, the stress relaxation layer 2 and the lower electrode 3 are formed on the substrate 1 in this order.

More specifically, on the substrate 1 composed of Nb1%-SrTiO$_3$ having a (100) orientation of the main growth surface, PbMg$_{0.5}$W$_{0.5}$O$_3$ material, for example, is deposited by sputtering, to thereby form the stress relaxation layer 2 having a thickness of about 100 nm.

Next, on the stress relaxation layer 2, at least one layer having at least any one selected from SrRuO$_3$, CaRuO$_3$, LaNiO$_3$, (La$_x$Sr$_{1-x}$)CoO$_3$ (0x1) and (La$_x$Sr$_{1-x}$)MnO$_3$ (0x1) as a major component is formed and then subjected to a predetermined process, to thereby form the lower electrode 3.

Next, as shown in FIG. 6B, the lower cladding layer 11, the core layer 12 and the upper cladding layer 13 are deposited in this order on the lower electrode 3, to thereby form the optical waveguide 4. The lower and upper cladding layers 11, 13 are formed using (PbLa)ZrO$_3$ as a material, by the sol-gel process. A sol-gel solution forming (PbLa)ZrO$_3$ is synthesized by refluxing Pb(CH$_3$COO)$_2$.3H$_2$O [lead acetate], La(i-OC$_3$H$_7$)$_3$ [lanthanum isopropoxide] and Zr(OC$_3$H$_7$)$_4$ [zirconium propoxide], which are organic compounds of the constituent metal elements, together with CH$_3$COCH2COCH$_3$[2,4-pentanedion] as a stabilizer, in CH$_3$C$_2$H$_4$OH [2-methoxyethanol] as a solvent.

More specifically, a (Pb$_{0.97}$La$_{0.02}$)ZrO$_3$ composition can be prepared by adjusting a molar ratio of Pb(CH$_3$COO)$_2$.3H$_2$O/La(i-OC$_3$H$_7$)$_3$ to 101/3, and a molar ratio of Zr(OC$_3$H$_7$)$_4$ to 100.

The core layer 12 is formed using anti-ferroelectric PbZrO$_3$ as a material using the sol-gel process. A sol-gel solution forming PbZrO$_3$ is synthesized by refluxing Pb(CH$_3$COO)$_2$.3H$_2$O [lead acetate] and Zr(OC$_3$H$_7$)$_4$ [zirconium propoxide], which are organic compounds of the constituent metal elements, together with CH$_3$COCH$_2$COCH$_3$ [2,4-pentanedion] as a stabilizer, in CH$_3$C$_2$H$_4$OH [2-methoxyethanol] as a solvent.

Using the sol-gel solutions prepared as described in the above, the lower cladding layer 11, core layer 12 and upper cladding layer 13 are stacked in this order, to thereby form the optical waveguide 4.

First, on the substrate 1 composed of Nb1%-SrTiO$_3$ having a (100) orientation of the main growth surface, a sol-gel precursor having a composition of (Pb$_{0.97}$La$_{0.02}$)ZrO$_3$ is coated by the spin coating process. Next, thus-coated, the sol-gel precursor is placed on a hot plate, and baked typically at 140 C for 5 minutes, and then at 350° C. at 5 minutes. Next, the substrate 1 is sintered in an oxygen atmosphere at 700° C. using an infrared oven. The film obtained by these process steps has a thickness of approximately 100 nm to 200 nm. These process steps are repeated until the thickness of about 3 μm, for example, is achieved, to thereby form the lower cladding layer 11 having a (Pb$_{0.97}$La$_{0.02}$)ZrO$_3$ composition.

Next, on the lower cladding layer 11, a sol-gel precursor of PbZrO$_3$ is coated by the spin coating process. Next, thus-coated, the sol-gel precursor is placed on a hot plate, and baked typically at 140° C. for 5 minutes, and at 350° C. at 5 minutes. Next, the substrate 1 is sintered in an oxygen atmosphere at 700° C. using an infrared oven. The film obtained by these process steps has a thickness of approximately 100 nm to 200 nm. These process steps are repeated until the thickness of about 4 μm, for example, is achieved to thereby form the core layer 12 composed of PbZrO$_3$.

Next, on the core layer 12, a sol-gel precursor having a composition of (Pb$_{0.97}$La$_{0.02}$)ZrO$_3$ is coated by the spin coating process, and thereby the upper cladding layer 13 of approximately 4 μm thick is formed similarly to the lower cladding layer 11.

By going through these process steps, the optical waveguide 4 including the lower cladding layer 11, core layer 12 and upper cladding layer 13 is formed. In the optical waveguide 4, the lower and upper cladding layers 11, 13 show a refractive index of 2.13 for 1.55-μm light, and the core layer 12 shows a refractive index of 2.16 for 1.55-μm light, proving a structure in which the refractive index of the upper and lower cladding layer 11, 13 differs from that of the core layer 12. The structure in which the core layer 12 has a refractive index greater than that of the lower and upper cladding layer 11, 13 is advantageous in that propagating light can be concentrated to the core layer 12, and thereby electrode loss can be suppressed.

Next, the deflection electrode is formed on the upper cladding layer 13.

More specifically, as shown in FIG. 6C, the upper electrode 5 is formed on the upper cladding layer 13, typically by vapor-depositing a triangle-patterned Cu/W film through a mask.

The voltage control unit 6 is connected to the lower electrode 3 and upper electrode 5, to thereby complete the optical deflector of this embodiment.

As has been described in the above, this embodiment successfully realizes an optical element capable of readily and accurately controlling the refractive index of the optical waveguide 4, and is adaptive to further downsizing.

A modified example of the first embodiment will be explained.

The modified example herein discloses an optical deflector which is similar to that in the first embodiment, but differs in the upper electrode. Any constituents identical to those in the first embodiment will be given with the same reference numerals, and explanations therefor will be omitted.

Figure 7A:
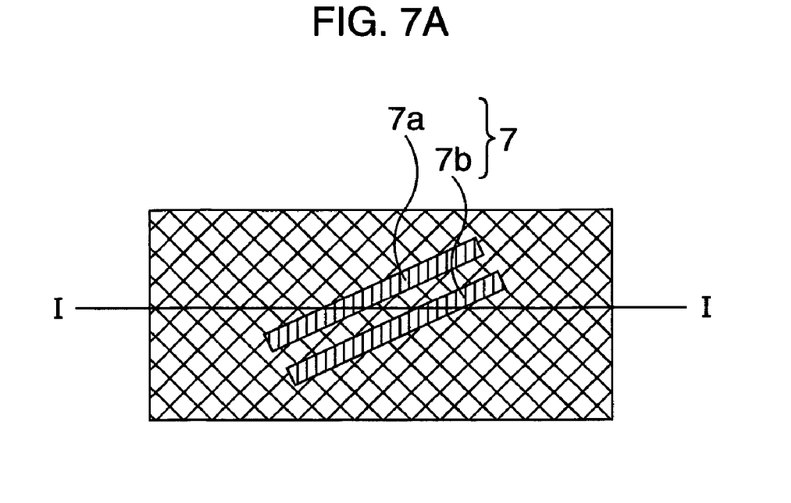
FIGS. 7A and 7B are schematic drawings showing a principal configuration of an optical deflector according to a modified example of the first embodiment.
Figure 7B:
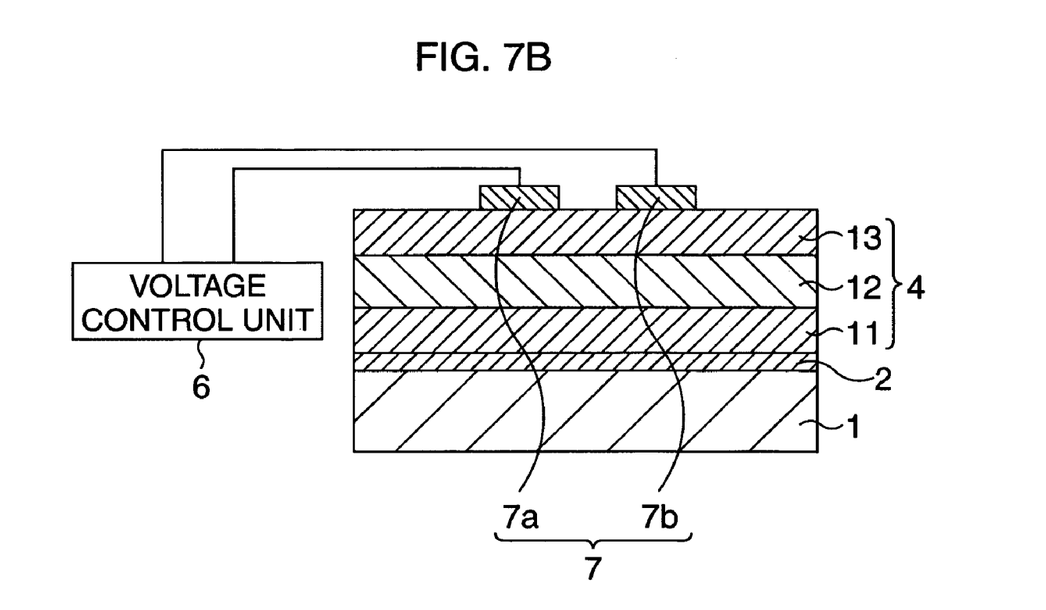

FIGS. 7A and 7B are schematic drawings showing a principal configuration an optical deflector according to the modified example of the first embodiment, wherein FIG. 7A is a plan view, and FIG. 7B is a sectional view taken along line I-I in FIG. 7A.

The optical deflector comprises the stress relaxation layer 2 formed on the substrate 1, the optical waveguide 4 composed of an electrooptical material and stacked on the stress relaxation layer 2, an upper electrode 7 disposed on the optical waveguide 4, and the voltage control unit 6 applying variable voltage to upper electrode 7.

The optical deflector of this modified example has no lower electrode provided thereto, and the substrate 1 is composed of a non-conductive material. The substrate in this modified example preferably uses an insulating material, and there is no problem on the substrate 1 herein because it has SrTiO$_3$ as a major component. The upper electrode 7 is configured, as shown in FIG. 7B, as having a pair of parallel band-formed electrodes 7a, 7b, wherein the band-formed electrodes 7a, 7b are disposed so as to obliquely intercept the direction of propagation of light. The individual connection terminals of the voltage control unit 6 herein are connected to the band-formed electrodes 7a, 7b. When voltage (binary voltage as described in the above) is applied between the band-formed electrodes 7a, 7b by the voltage control unit 6, an electric field is formed in the in-plane direction of the optical waveguide 4. This equalizes amounts of change in the refractive index with respect to the electric field both in the TE mode and TM mode, and therefore realizes an optical deflector having a refractive index which is not polarization-dependent.

As has been described in the above, this modified example successfully realizes an optical element capable of readily and accurately controlling the refractive index of the optical waveguide 4, and is adaptive to further downsizing. The optical deflector conveniently has a refractive index which is not polarization-dependent.

A second embodiment discloses an exemplary configuration of the optical switch of the present invention.

Figure 8A:
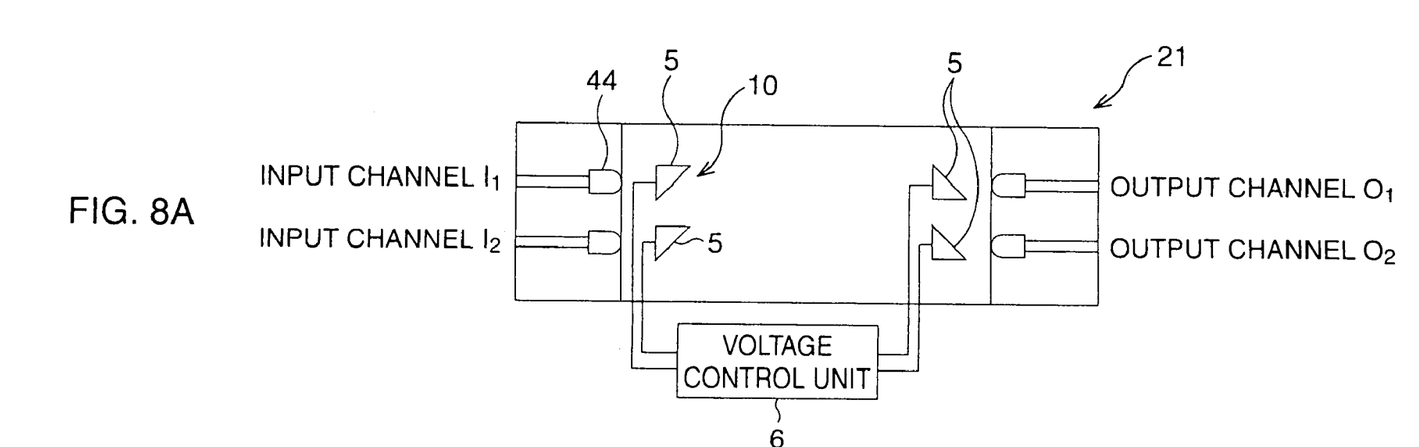
FIGS. 8A and 8B are schematic drawings showing a principal configuration of an optical switch according to a second embodiment.
Figure 8B:
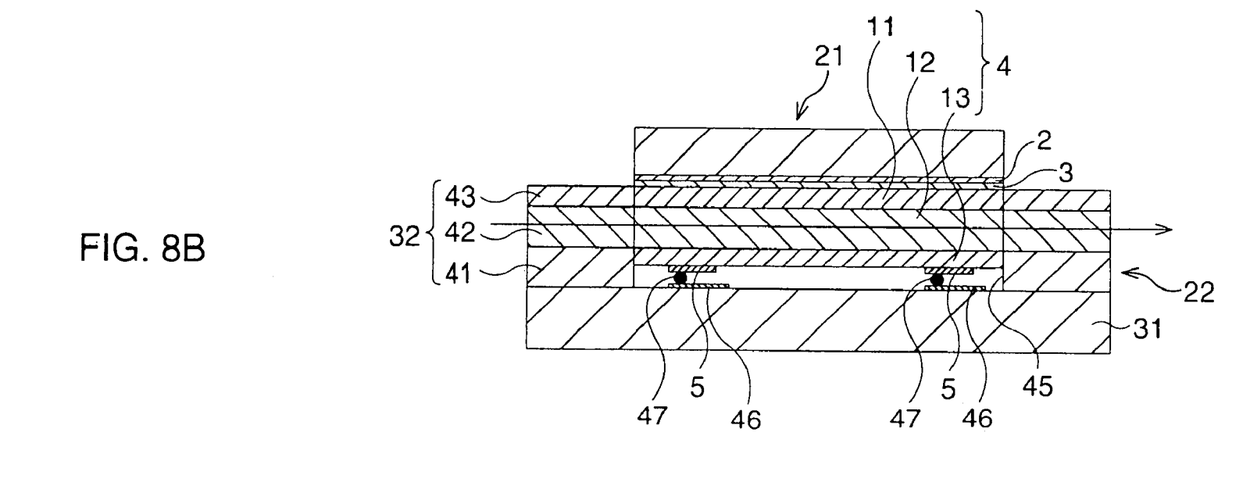

FIGS. 8A and 8B are schematic drawings showing a general configuration of the optical switch according to the second embodiment, wherein the FIG. 8A is a schematic plan view showing only a principal constituent of the optical switch, and FIG. 8B is a schematic sectional view taken along the dashed line I-I in FIG. 8A. Any constituents identical to those in the first embodiment will be given with the same reference numerals, and detailed explanations therefor will be omitted. FIG. 8B also omits illustration of the voltage control unit 6 for convenience of the illustration.

The optical switch of this embodiment is configured as disposing the optical deflector 10 according to the first embodiment by twos in parallel respectively at the input portion and output potion.

The optical switch is of 2×2 arrangement, and is configured as having a principal constituent 21 having an optical deflection mechanism, and a channel forming portion 22 in which the principal constituent 21 is disposed.

The channel forming portion 22 is configured as having a channel substrate 31 and a channel waveguide 32 disposed thereon.

The channel waveguide 32 includes a core layer 42, in which an optical path is formed, disposed between a lower cladding layer 41 and an upper cladding layer 43, and input channels $I_1$, $I_2$ and output channels $O_1$, $O_2$ for light signal transmission. The input channels $I_1$, $I_2$, each having a microlens 44 collimating the signal light provided to the end portion thereof, are disposed in parallel at regular intervals. The output channel $O_1$, $O_2$, each of which similarly having a microlens 44 at the rear end portion thereof, are disposed in parallel at regular intervals. The channel waveguide 32 has, formed therein, a groove 45 in which the principal constituent 21 is mounted, and on the surface of the channel substrate 31 exposed in the bottom of the groove 45 has various wiring layers 46 patterned thereon.

In the channel forming portion 22, a $SiO_2$ film of approximately 5 μm thick is formed typically by thermally oxidizing the surface of the channel substrate 31 composed of Si, and Ga is doped into the $SiO_2$ film as deep as 3 μm or around from the surface thereof, to thereby form the lower cladding layer 41 of approximately 2 μm thick, and the core layer 42 of approximately 2 μm. Thereafter an $SiO_2$ film of approximately 2 μm is formed on the core layer 42 typically by the sol-gel process or a sputtering process, to thereby form the upper cladding layer 43. The upper cladding layer 43, core layer 42 and lower cladding layer 41 are then dry-etched typically using a $CF_4$-base gas as an etching gas, to thereby pattern the groove 45.

From a substantial point of view, the principal constituent 21 of the optical switch 20 is configured so that the optical deflector 10 according to the first embodiment is disposed corresponding to each of the input channels $I_1$, $I_2$ and to each of the output channels $O_1$, $O_2$, using the optical waveguide 4 in common.

Each optical deflector 10 is configured so that the optical waveguide 4 is disposed on the element-forming substrate 1 while placing the stress relaxation layer 2 and lower electrode 3 in between, and the upper electrodes 5 are formed on the optical waveguide 4. More specifically, the principal constituent 21 is configured so that each of the upper electrodes 5 is formed on the optical waveguide 4 so as to correspond to each of the input channels $I_1$, $I_2$ and each of the output channels $O_1$, $O_2$, and so that the voltage control unit 6 applying a variable voltage (binary voltage as described in the above) between the lower electrodes 3 and the individual upper electrodes 5 is provided. The upper electrodes 5 on the input channel side are disposed ahead of the input channels in the direction of propagation of light, and the upper electrodes 5 on the output channel side are disposed behind the output channels in the direction of propagation of light, wherein the prism geometries on the input channel side and on the output channel side are inverted, so that the positive-negative relation of deflection direction of light caused by voltage application through the voltage control unit 6 is inverted between the input channel side and output channel side.

Figure 9:
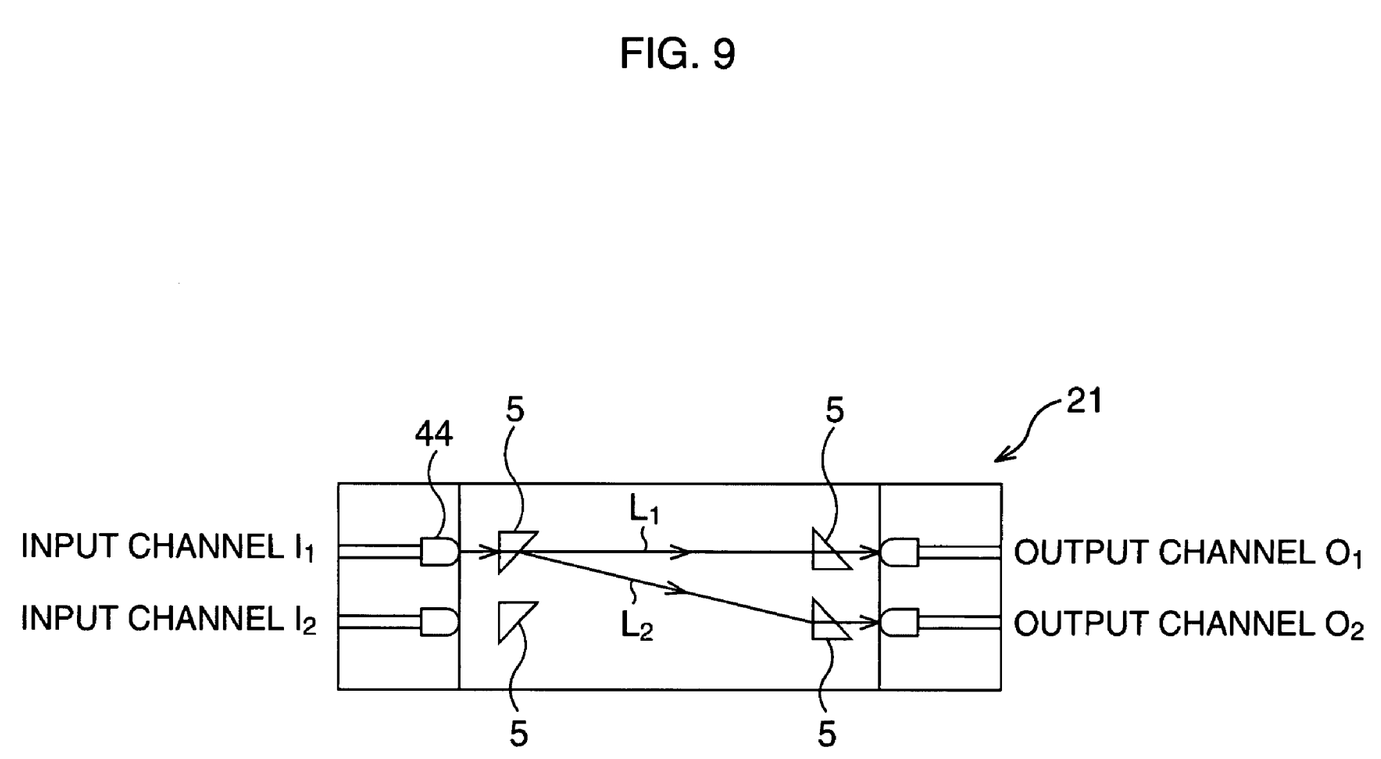
FIG. 9 is a schematic plan view explaining a method of controlling signal light using the optical switch according to the second embodiment.

A method of controlling signal light in the optical switch of this embodiment will be explained referring to FIG. 9. FIG. 9 omits illustration of the voltage control unit 6 for simplicity.

The description herein exemplifies respective cases where a signal light is sent from the input channel $I_1$ to the output channel $O_1$, and from the input channel $I_1$ to the output channel $O_2$.

When the signal light is sent from the input channel $I_1$ to the output channel $O_1$, no voltage is applied (in other words, 0 V is applied as the first voltage) by the voltage control unit 6 between the lower electrode 3 and the individual upper electrodes 5, and this allows the light to go straight towards the output channel $O_1$ as indicated by $L_1$ in the drawing.

When the signal light is sent from the input channel $I_1$ to the output channel $O_2$, the second voltage is applied by the voltage control unit 6 between the lower electrode 3 and the upper electrode 5 of the input channel $I_1$, and the second voltage is applied also between the lower electrode 3 and the upper electrode 5 of the output channel $I_2$. The voltage application varies the refractive index of the optical waveguide 4 under the upper electrode 5 of the input channel $I_1$ and thereby deflects the signal light so as to direct it to the output channel $O_2$ as indicated by $L_2$ in the drawing, and at the same time varies the refractive index of the optical waveguide 4 under the upper electrode 5 of the output channel $O_2$ and thereby deflects the signal light to the opposite direction so as to direct it straight towards the output channel $O_2$.

As has been described in the above, this embodiment successfully realizes an optical element capable of readily and accurately controlling the refractive index of the optical waveguide 4, and is adaptive to further downsizing.

A modified example of the second embodiment will be explained next.

The modified example herein discloses an optical switch which is similar to that of the second embodiment, but differs in that a plurality of principal constituents are connected in series. The optical switch of this embodiment has "n" optical waveguides connected in series, where n is an integer of 2 or larger, the principal constituent of the first stage has 2 input channels provided thereto, and the principal constituent of the n-th stage has 2n output channels provided thereto. Any constituents identical to those of the optical switch in the second embodiment will be given with the same reference numerals, and detailed explanations therefor will be omitted.

Figure 10:
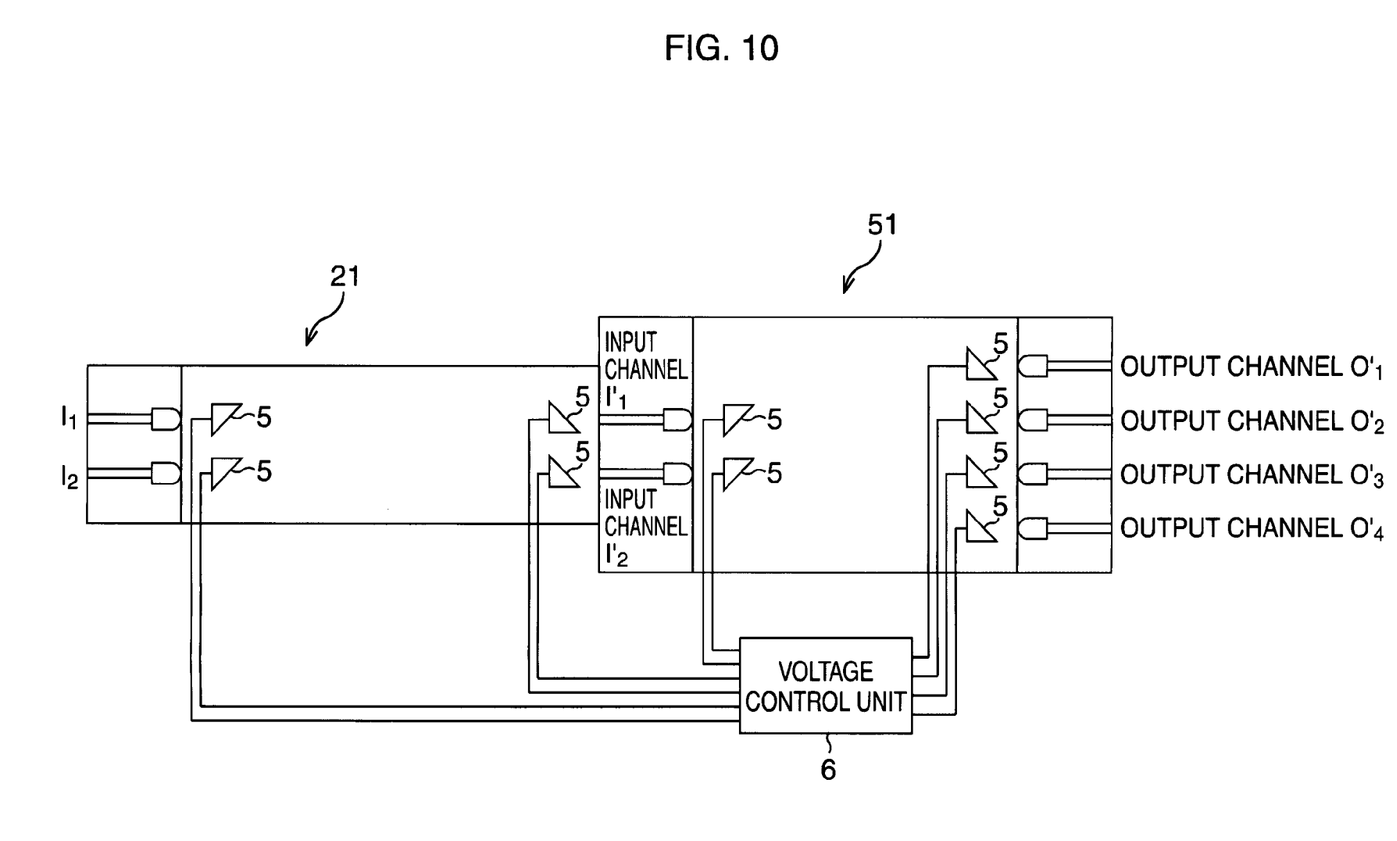
FIG. 10 is a schematic plan view showing an principal configuration of the optical switch according to a modified example of the second embodiment.

FIG. 10 is a schematic plan view showing the principal constituent according to the modified example of the second embodiment.

A case with n=2 is exemplified herein. That is, the optical switch is configured by series connection of the principal constituent 21 of 2×2 arrangement provided with the input channels and output channels by twos as disclosed in the second embodiment, and a principal constituent 51 of 4×4 arrangement provided with the input channels and output channels by fours.

From a substantial point of view, the principal constituent 51 is configured so that the optical deflector 10 according to the first embodiment is disposed corresponding to each of the input channels $I'_1$, $I'_2$, $I'_3$, $I'_4$ and to each of the output channels $O'_1$, $O'_2$, $O'_3$, $O'_4$, using the optical waveguide 4 in common.

Each optical deflector 10 is configured so that the optical waveguide 4 is disposed on the element-forming substrate 1 while placing the stress relaxation layer 2 and lower electrode 3 in between, and the upper electrodes 5 are formed on the optical waveguide 4. More specifically, the principal constituent 51 is configured so that each of the upper electrodes 5 is formed on the optical waveguide 4 so as to correspond to each of the input channels $I'_1$, $I'_2$, $I'_3$, $I_1$, and each of the output channels $O'_1$, $O'_2$, $O'_3$, $O'_1$, and so that the voltage control unit 6 applying variable voltage (binary voltage as described in the above) between the lower electrodes 3 and the individual upper electrodes 5 is provided. The upper electrodes 5 on the input channel side are disposed ahead of the input channels in the direction of propagation of light, and the upper electrodes 5 on the output channel side are disposed behind the output channels in the direction of propagation of light, wherein the prism geometries on the input channel side and on the output channel side are inverted, so that the positive-negative relation of deflection direction of light caused by voltage application through the voltage control unit 6 is inverted between the input channel side and output channel side.

The optical switch is configured by connecting the principal constituent 21 and principal constituent 51, so that the output channels $O_1$, $O_2$ of the principal constituent 21 are aligned with the input channels $I'_2$, $I'_3$ of the principal constituent 51.

Figure 11:
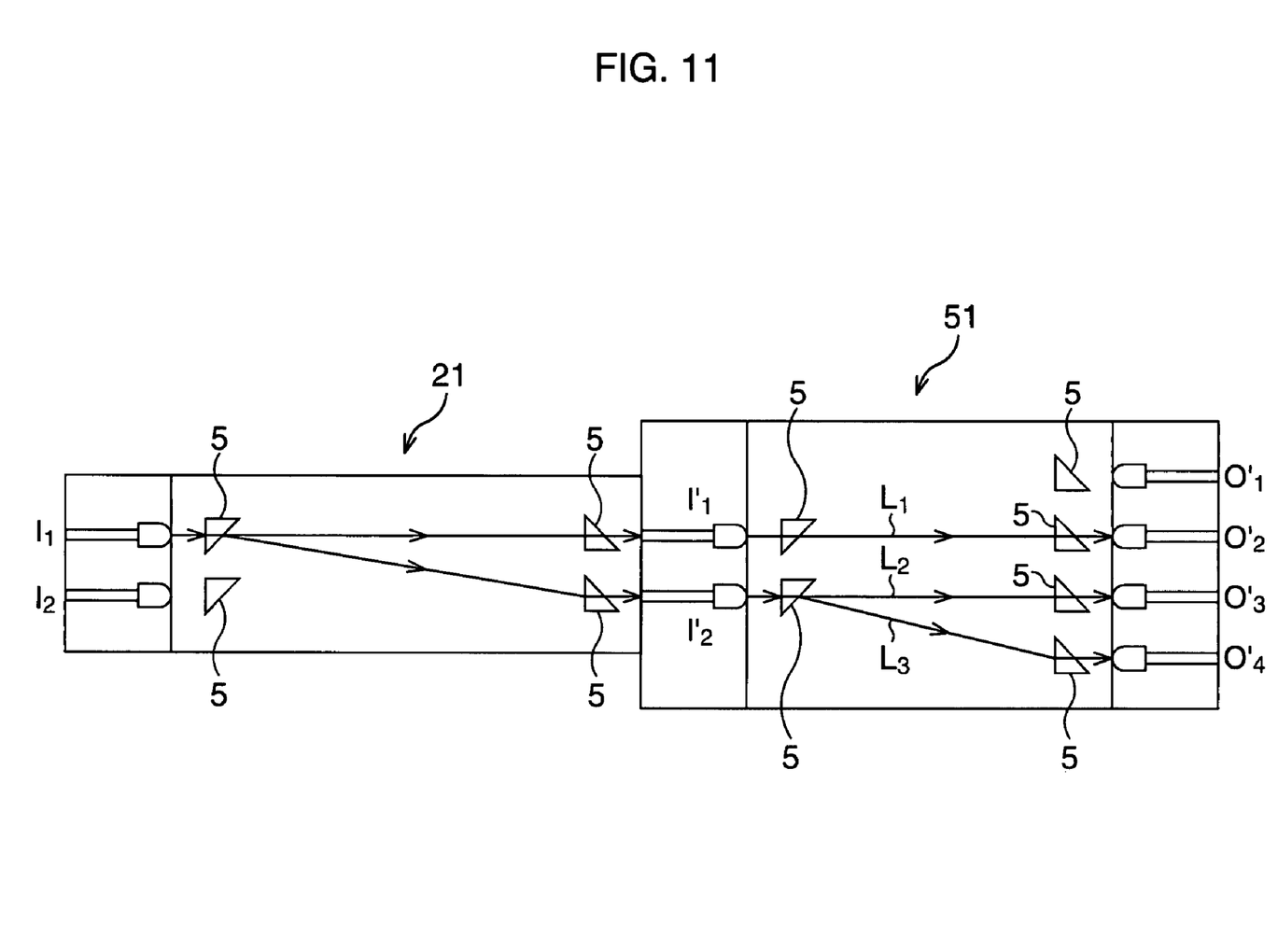
FIG. 11 is a schematic plan view explaining a method of controlling signal light using the optical switch according to the modified example of the second embodiment.

A method of controlling signal light in the optical switch of this embodiment will be explained referring to FIG. 11. FIG. 11 omits illustration of the voltage control unit 6 for simplicity.

The description herein exemplifies respective cases where a signal light is sent from the input channel $I_1$ of the principal constituent 21 to the output channel $O'_2$ of the principal constituent 51, from the input channel $I_1$ of the principal constituent 21 to the output channel $O'_3$ of the principal constituent 51, and from the input channel $I_1$ of the principal constituent 21 to the output channel $O'_4$ of the principal constituent 51.

When the signal light is sent from the input channel $I_1$ of the principal constituent 21 to the output channel $O'_2$ of the principal constituent 51, no voltage is applied (in other words, 0 V is applied as the first voltage) by the voltage control unit 6 between the lower electrode 3 and the individual upper electrodes 5 of the principal constituents 21, 51, and this allows the light to go straight towards the output channel $O'_2$, as indicated by $L_1$ in the drawing.

When the signal light is sent from the input channel $I_1$ of the principal constituent 21 to the output channel $O'_3$ of the principal constituent 51, the second voltage on the principal constituent 21 side is applied by the voltage control unit 6 between the lower electrode 3 and the upper electrode 5 of the input channel $I_1$, and at the same time between the lower electrode 3 and the upper electrode 5 corresponded to the output channel $O_2$. The voltage application varies the refractive index of the optical waveguide 4 below the upper electrode 5 of the input channel $I_1$ and thereby deflects the signal light so as to direct it to the output channel $O_2$, and at the same time varies the refractive index of the optical waveguide 4 below the upper electrode 5 corresponding to the output channel $O_2$ and thereby deflects the signal light to the opposite direction so as to direct it straight towards the output channel $O_2$, that is, the input channel $I'_2$ of the principal constituent 51.

Next, on the principal constituent 51 side, no voltage is applied (in other words, 0 V is applied as the first voltage) by the voltage control unit 6 between the lower electrode 3 and the individual upper electrodes 5, and this allows the light to go straight towards the output channel $O'_3$ as indicated by $L_2$ in the drawing.

When the signal light is sent from the input channel $I_1$ of the principal constituent 21 to the output channel $O'_4$ of the principal constituent 51, the second voltage on the principal constituent 21 side is applied by the voltage control unit 6 between the lower electrode 3 and the upper electrode 5 of the input channel $I_1$, and at the same time between the lower electrode 3 and the upper electrode 5 corresponded to the output channel $O_2$. The voltage application varies the refractive index of the optical waveguide 4 under the upper electrode 5 of the input channel $I_1$ and thereby deflects the signal light so as to direct it to the output channel $O_2$, and at the same time varies the refractive index of the optical waveguide 4 under the upper electrode 5 corresponded to the output channel $O_2$ and thereby deflects the signal light to the opposite direction so as to direct it straight towards the output channel $O_2$, that is, the input channel $I'_2$ of the principal constituent 51.

Next, on the principal constituent 51 side, the second voltage is applied by the voltage control unit 6 between the lower electrode 3 and the upper electrode 5 of the input channel $I'_2$, and at the same time between the lower electrode 3 and the upper electrode 5 of the output channel $O'_4$. The voltage application varies the refractive index of the optical waveguide 4 under the upper electrode 5 of the input channel $I'_2$ and thereby deflects the signal light $L_3$ so as to direct it to the output channel $O'_4$, and at the same time varies the refractive index of the optical waveguide 4 under the upper electrode 5 of the output channel $O'_4$ and thereby deflects the signal light to the opposite direction so as to direct it straight towards the output channel $O'_4$.

In the signal light transmission from the input channel $I_1$ of the principal constituent 21 to the output channel $O'_4$ of the principal constituent 51, the optical switch as a whole is successful in obtaining light deflection which is twice as large as that possibly attained when the second voltage is applied by only a single principal constituent for sending the signal light from the input channel $I_1$ to the output channel $O'_4$, substantially realizing an optical switch of 4×4 arrangement.

As has been described in the above, this modified example successfully realizes an optical element capable of readily and accurately controlling the refractive index of the optical waveguide 4, and is adaptive to further downsizing. The optical deflector is very convenient because the refractive index thereof is not polarization-dependent. This case is still more advantageous in obtaining a large light deflection depending on the number of connection of the principal constituents, realizing an optical switch of 2n×2n arrangement only by controlling the binary voltage.

In this modified example, it is also allowable to form the individual core layers 12 of the principal constituent 21 and principal constituent 51 using anti-ferroelectric materials having different voltages under which the anti-ferroelectric phase transition point is attained. This configuration realizes an optical switch capable of obtaining a still larger light deflection, or more finer control of the light deflection.

What is claimed is:

1. An optical element comprising:
   a substrate;
   an electrooptical film formed over said substrate, said film being composed of at least one layer of anti-ferroelectric material having an electrooptic effect; and
   a voltage control means for applying a variable voltage to said electrooptic effect film so as to control a refractive index thereof for light passing through said electrooptic effect film,
   wherein said voltage control means controls said refractive index based on two voltage values including a first voltage less than a reference value, said reference value being a voltage below which the anti-ferroelectric phase transition point of said electrooptic effect film is attained, and a second voltage greater than said reference value, and
   wherein said optical element has, as being configured therein, an optical waveguide comprising at least one layer of said electrooptic effect film.

2. The optical element according to claim 1, wherein said substrate is composed of a material having SrTiO3 as a major component.

3. The optical element according to claim 1, wherein said electrooptic effect film is epitaxially grown in the direction of crystal orientation of said substrate.

4. The optical element according to claim 1, wherein said optical waveguide comprises a core layer composed of said electrooptic effect film, and lower and upper cladding layers holding said core layer in between, said core layer and said cladding layers differing in the refractive index.

5. The optical element according to claim 1, further comprising, as being disposed between said substrate and said electrooptic effect film, a lower electrode through which voltage from said voltage control means is applied.

6. The optical element according to claim 5, wherein said lower electrode is configured as having at least one film having at least any one selected from $SrRuO_3$, $CaRuO_3$, $LaNiO_3$, $(La_xSr_{1-x})CoO_3$ ($0 \leq x \leq 1$) and $(La_xSr_{1-x})MnO_3$ ($0 \leq x \leq 1$) as a major component.

7. The optical element according to claim 1, further comprising, as being disposed on said electrooptic effect film, an upper electrode through which voltage from said voltage control means is applied.

8. The optical element according to claim 1, further comprising, as being disposed on said electrooptic effect film, a pair of electrodes through which voltage from said voltage control means is applied.

9. The optical element according to claim 1, wherein said electrooptic effect film has a simple perovskitic structure.

10. The optical element according to claim 9, wherein said simple perovskitic structure contains at least any one selected from $NaNbO_3$, $PbZrO_3$, $Pb(Mg_{1/2}W_{1/2})_xO_3$, $Pb(Cd_{1/2}W_{1/2})_xO_3$, $Pb(Mn_{1/2}Re_{1/2})_xO_3$, $Pb(Yb_{1/2}Nb_{1/2})_xO_3$, $Pb(Lu_{1/2}Nb_{1/2})_xO_3$, $Pb(La_{1/2}Ta_{1/2})_xO_3$, $Pb(Mn_{2/3}W_{1/3})_xO_3$, $(1-x)NaTaO_3.xKNbO_3$ ($0.4 \leq x \leq 1$), $(1-x)NaNbO_3.xKTaO_3$ ($0 \leq x \leq 1$), $(1-x)PbZrO_3.xNaNbO_3$ ($0 \leq x \leq 0.1$, $0.8 \leq x \leq 1$), $(1-x)NaNbO_3.x(1/2PbNb_2O_6)$ ($0 \leq x \leq 0.1$), $(1-x)PbZrO_3.xPbTiO_3$ ($0 \leq x \leq 0.1$), $(1-x)PbHfO_3.xCaHfO_3$ ($0 \leq x \leq 0.2$), $(1-x)(Na_{1/2}Bi_{1/2})TiO_3.xPbZrO_3$ ($0.9 \leq x \leq 1$), $(1-x)PbZrO_3.x(K_{1/2}Bi_{1/2})ZrO_3$ ($0.4 \leq x \leq 1$), $(1-x)NaTaO_3.xKNbO_3$ ($0.4 \leq x \leq 1$, $0 \leq x \leq 0.5$), $xPb(Fe_{2/3}U_{1/3})O_3 \cdot (1-x)PbZrO_3$ ($0 \leq x \leq 0.1$), $(Pb_{1-x}Sr_x)(Ti_{1-y}Zr_y)O_3$ ($0 \leq x \leq 0.4$, $0.7 \leq y \leq 1$), $(1-x)Pb(Ti_{1-y}Zr_y)O_3.xLaFeO_3$ ($0 \leq x \leq 0.2$, $0.7 \leq y \leq 1$), $(Pb_{0.97}La_{0.02})(Ti_{1/2}(Zr_{1-x}Sn_x)_{1/2})O_3$ ($0 \leq x \leq 0.5$), $0.9(Pb_{0.99}(Ti_{0.98}Nb_{0.02})O_3 \cdot 0.1(xPb_{0.99}(Sn_{0.98}Nb_{0.02})O_3 \cdot (1-x)Pb_{0.99}(Zr_{0.98}Nb_{0.02})O_3$ ($0.5 \leq x \leq 1$), $Pb_{0.987}(Ti_xZr_{0.975-x}Nb_{0.025})O_3$ ($0.5 \leq x \leq 1$) and $(Pb_{1-x}La_{(3/2)x})(Zr_{1-y}Ti_y)$ ($0 \leq x \leq 0.3$, $0.8 \leq y \leq 1$).

11. The optical element according to claim 1, wherein said electrooptic effect film is configured to have at least one layer having a tungsten bronze structure.

12. The optical element according to claim 11, wherein said tungsten bronze structure contains at least any one selected from $(Pb_{1-x}Ba_x)Nb_2O_6$ ($0 \leq x \leq 0.4$), $(1-x)(PbNb_2O_6) \cdot 2xPbTiO_3$ ($0 \leq x \leq 0.1$) and $Ba_{1-x}Ca_xNb_2O_6$ ($0 \leq x \leq 0.6$).

13. An optical element comprising:
   a substrate;
   an electrooptical film formed over said substrate, said film being composed of at least one layer of anti-ferroelectric material having an electrooptic effect;
   a voltage control means for applying a variable voltage to said electrooptic effect film so as to control a refractive index thereof for light passing through said electrooptic effect film,
   said voltage control means having a first voltage region showing nearly constant refractive index with respect to the applied voltage, and a second voltage region showing an abrupt change in the refractive index with respect to the applied voltage; and
   wherein said optical element has, as being configured therein an optical waveguide comprising at least one layer of said electrooptic effect film.

* * * * *